United States Patent
Lin et al.

(10) Patent No.: US 10,612,632 B2
(45) Date of Patent: Apr. 7, 2020

(54) BALL SCREW STRUCTURE WITH DETECTION FUNCTION

(71) Applicant: HIWIN TECHNOLOGIES CORP., Taichung (TW)

(72) Inventors: Ying-Ju Lin, Taichung (TW); Chia-Ming Yang, Taichung (TW); Ping-Huan Hsieh, Taichung (TW); Min-Hsiu Wu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 144 days.

(21) Appl. No.: 15/869,011

(22) Filed: Jan. 11, 2018

(65) Prior Publication Data
US 2019/0211905 A1    Jul. 11, 2019

(51) Int. Cl.
*F16H 25/22* (2006.01)
*F16H 25/20* (2006.01)

(52) U.S. Cl.
CPC ..... *F16H 25/2214* (2013.01); *F16H 25/2219* (2013.01); *F16H 25/2015* (2013.01)

(58) Field of Classification Search
CPC .. F16H 25/2015; F16H 25/22; F16H 25/2204; F16H 25/2214; F16H 25/2219; F16H 25/24; F16H 57/01
See application file for complete search history.

(56) References Cited

U.S. PATENT DOCUMENTS

| | | | | |
|---|---|---|---|---|
| 6,220,110 B1* | 4/2001 | Yang | ............ | F16H 25/2219 74/424.87 |
| 6,668,672 B2* | 12/2003 | Kuo | ............ | F16H 25/2219 74/424.82 |
| 7,565,954 B2* | 7/2009 | Kawahara | ............ | B60T 13/741 188/1.11 L |
| 7,777,481 B2* | 8/2010 | Singh | ............ | F16C 29/0633 324/174 |
| 7,930,949 B2* | 4/2011 | Singh | ............ | F16H 25/20 74/424.71 |
| 8,261,626 B2* | 9/2012 | Liou | ............ | F16H 25/2219 74/424.71 |
| 9,182,023 B2* | 11/2015 | Jiang | ............ | F16H 25/2214 |

(Continued)

FOREIGN PATENT DOCUMENTS

| | | |
|---|---|---|
| JP | 2007225024 A | 9/2007 |
| JP | 2008144938 | 6/2008 |

(Continued)

*Primary Examiner* — Adam D Rogers
(74) *Attorney, Agent, or Firm* — Leong C. Lei (57) ABSTRACT

A ball screw structure with detection function includes a screw shaft having an external screw groove; a nut mounted to the screw shaft to be movable in an axial direction of the screw shaft and having an internal screw groove, which corresponds to the external screw groove of the screw shaft to define a loading channel between the internal screw groove of the nut and the external screw groove of the screw shaft; a ball assembly movable, through rolling, in the loading channel; and a recirculation member directly mounted to the nut and provided thereon with a microcontroller and a sensor to detect a rotation state of the screw shaft inside the nut and further formed with a recirculation passage in communication with the nut to allow the ball assembly to move and recirculate therethrough.

5 Claims, 10 Drawing Sheets

(56) References Cited

U.S. PATENT DOCUMENTS

| | | | | |
|---|---|---|---|---|
| 9,188,164 B2* | 11/2015 | Huag | ............... | F16H 25/2214 |
| 9,464,703 B2* | 10/2016 | Jeng | ............... | F16H 25/2204 |
| 2009/0071278 A1* | 3/2009 | Chiu | ............... | F16H 25/2204 |
| | | | | 74/424.82 |
| 2011/0096808 A1* | 4/2011 | Hwang | ............ | F16H 25/2021 |
| | | | | 374/141 |
| 2013/0199324 A1* | 8/2013 | Piltz | ............... | F16H 25/2214 |
| | | | | 74/424.86 |

FOREIGN PATENT DOCUMENTS

| | | | |
|---|---|---|---|
| JP | 2014114944 A | | 6/2014 |
| JP | 5722365 | | 5/2015 |
| JP | 5722365 | B2 | 5/2015 |
| JP | 6163759 | | 7/2017 |

\* cited by examiner

BALL SCREW STRUCTURE WITH DETECTION FUNCTION

(a) TECHNICAL FIELD OF THE INVENTION

The present invention generally relates to a ball screw, and more particularly to a ball screw structure with detection function.

(b) DESCRIPTION OF THE PRIOR ART

A ball screw is a high-loading linear transmission device. However, operating at an excessive speed may cause undesired large vibration due to impacts of balls on other components (such as a recirculation cover). This may lead to damage of the components and eventually cause jamming of the screw. Heretofore, detection of the rotation state of the ball screw is achieved by additionally installing a sensor, such as Japanese Patents JPA2008144938, JPA2007225024, and JPB5722365.

Taking JPA2008144938 as an example, a sensor element, in the form of a block, is additionally installed and this extends the overall length of a nut, causing an undesired influence on movement strokes. In addition, a controller must be provided to control switching of a switch. For JPA2007225024, a recess is provided in an end face of a nut or in the nut and a detection device is arranged in the recess. The detection device functions to detect a moving condition of balls. The arrangement of the detection device increases the overall length of the nut, and in addition, a magnetic mechanism that is provided for maintaining the position of balls is generally complicated. As to JPA5722365, a sensor and a controller are mounted externally and this leads to necessary variation of the configuration and size of a nut.

SUMMARY OF THE INVENTION

To overcome such technical deficiencies of the prior art, the present invention provides a ball screw structure, which comprises a microcontroller and a sensor that are mounted in a recirculation cover, wherein the recirculation cover is directly provided in the inside thereof with a recirculation channel to allow a ball assembly to move therethrough for recirculation and is removably mounted to a flattened portion of the nut with occupying an additional space so as to directly detect a rotation state of the screw shaft and to indicate the detect screw shaft state in the form of a signal of sound (with a buzzer) and lighting (with a light-emitting diode), such as making bright and dark or flashing or to transmit a signal with a signal transmission unit in a wireless or wired manner to a receiver unit (such as a computer, a small phone, and a tablet computer) for achieving a purpose of diagnosis and inspection of the screw shaft state.

To achieve the above objective, the present invention provides a ball screw structure with detection function, which comprises a screw shaft that comprises an external screw groove; a nut, which is mounted to the screw shaft in a manner of being movable in an axial direction of the screw shaft, the nut comprising an internal screw groove, the internal screw groove being arranged to correspond to the external screw groove of the screw shaft, the internal screw groove of the nut and the external screw groove of the screw shaft collectively defining a loading channel therebetween; a ball assembly, which is movable, through rolling, in the loading channel; and a recirculation member, which is removably mounted to the nut and is operable to detect a rotation state of the screw shaft inside the nut, the recirculation member being formed therein with a recirculation passage in communication with the nut to allow the ball assembly to move and recirculate therethrough.

In some embodiments, the recirculation member is made in the form of a recirculation cover that comprises a cover body and two recesses, and the cover body is mounted to the nut, the two recesses being formed in a surface of the cover body that is distant from the nut, one of the recesses receiving and holding therein the microcontroller, the other one of the recesses receiving and holding therein the sensor.

In some embodiments, the recirculation member comprises two end covers. The two end covers are mounted to two ends of the nut. One of the end covers has an end surface facing the nut and formed with two recesses. One of the recesses receives and holds therein the microcontroller. The other one of the recesses receives and holds therein the sensor. An opposite end of the end cover is formed with a first accommodation compartment and a second accommodation compartment that respectively receive and hold therein a battery and an alarm unit therein. The battery is electrically connected with the microcontroller and the sensor.

In some embodiments, the recirculation member comprises two end plugs. The nut is formed with two mounting grooves. The two end plugs are respectively mounted in the two mounting grooves. One of the end plugs is formed with a recess, and the recess receives and holds therein the microcontroller and the sensor.

In some embodiments, the nut is formed, in an end face thereof that is distant from the recirculation cover, with a first accommodation compartment that receives and holds therein a battery, the battery being electrically connected with the microcontroller and the sensor; the nut is further formed, in the end face thereof that is distant from the recirculation cover, with a second accommodation compartment that receives and holds therein an alarm unit, the alarm unit being a buzzer or a light-emitting diode.

In some embodiments, the recirculation member has a surface that faces the nut and is provided with a connection line guide groove that allows circuit lines of the microcontroller and the sensor to electrically connect, by way of the connection line guide groove, to the battery.

In some embodiments, the sensor can be an accelerometer.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-5, the present invention provides, in a first preferred embodiment thereof, a ball screw structure with detection function, generally designated at 100, which comprises a screw shaft 1, a nut 2, a ball assembly 3, and a recirculation member 4.

The screw shaft 1 comprises an external screw groove 11.

The nut 2 is mounted to the screw shaft 1 in a manner of being movable in an axial direction of the screw shaft 1, and the nut 2 comprises an internal screw groove 21. The internal screw groove 21 is arranged to correspond to the external screw groove 11 of the screw shaft 1 so that the internal screw groove 21 of the nut 2 and the external screw groove 11 of the screw shaft 1 collectively define a loading channel T therebetween. The nut 2 comprises a tubular body 22 and an outward-projecting flange 23. The outward-projecting flange 23 is circumferentially formed around an end of the tubular body 22 and extends radially outward therefrom. The internal screw groove 21 is formed on an inner circumferential surface of the tubular body 22. The tubular body 22 is provided, on an upper part thereof with a flattened portion 221, two threaded holes 222, and two recirculation holes 223.

The ball assembly 3 comprises a plurality of balls, which are movable, through rolling, in the loading channel T.

In the instant embodiment, the recirculation member 4 is embodied as a recirculation cover 4 and the recirculation cover is removably mounted to the nut 2 and is operable to detect a rotation state of the screw shaft 1 inside the nut 2. The recirculation member 4 is provided on the inside thereof with a recirculation passage 47 to allow the ball assembly 3 to move therethrough for recirculation by way of the two recirculation holes 223. In other words, the recirculation member 4 comprises a cover body 40, two through holes 41, and two recesses 42, 43. The two through holes 41 are formed in a surface of the cover body 40 that is distant from the flattened portion 221 of the nut 2. Two bolts 9 are received through the two through holes 41 to screw into and fix to the two threaded holes 222 so as to attach the cover body 40 of the cover 4 to the flattened portion 221 of the tubular body 22 of the nut 2. The two recesses 42, 43 are formed in a surface of the cover body 40 that faces the flattened portion 221 of the nut 2, wherein one of recesses (recess 42) receives and holds therein a microcontroller 44, and the other one of the recesses (recess 43) receives and holds a sensor 45 therein. The sensor 45 can be an accelerometer, but is not limited thereto.

Further, the outward-projecting flange 23 of the nut 2 is formed with a first accommodation compartment 24 and a second accommodation compartment 25. The first accommodation compartment 24 receives and holds therein a battery 5. The battery 5 is electrically connected to the microcontroller 44 and the sensor 45 that are arranged in the cover body 40 of the cover 4. The second accommodation compartment 25 receives and holds therein an alarm unit 6. The alarm unit 6 can be a buzzer or a lighting assembly, and the lighting assembly may comprise at least one light-emitting diode, but is not limited thereto.

Figure 1:
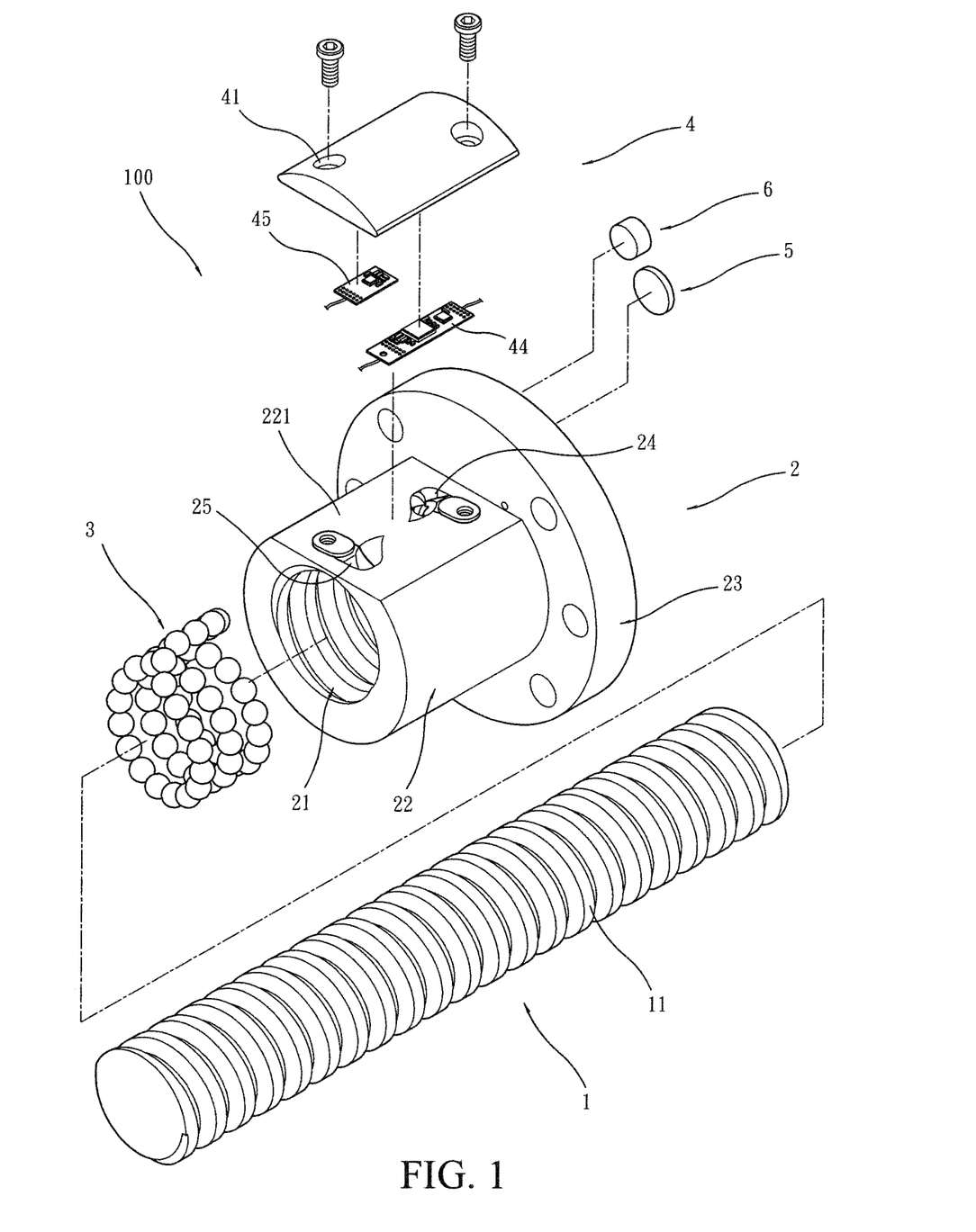
FIG. 1 is an exploded view, taken from a front side, showing a first preferred embodiment of the present invention.
Figure 2:
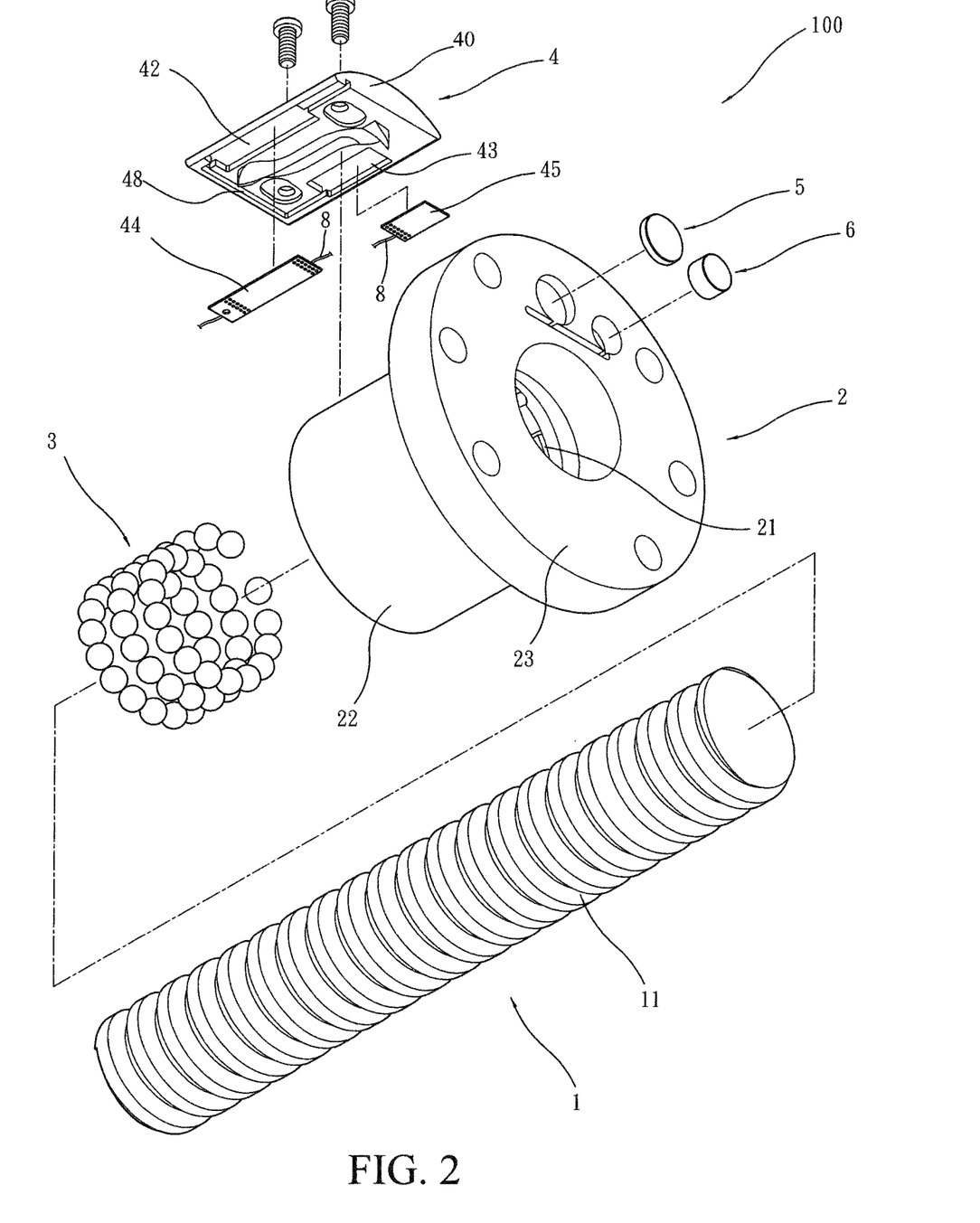
FIG. 2 is an exploded view, taken from a rear side, showing the first preferred embodiment of the present invention.
Figure 3:
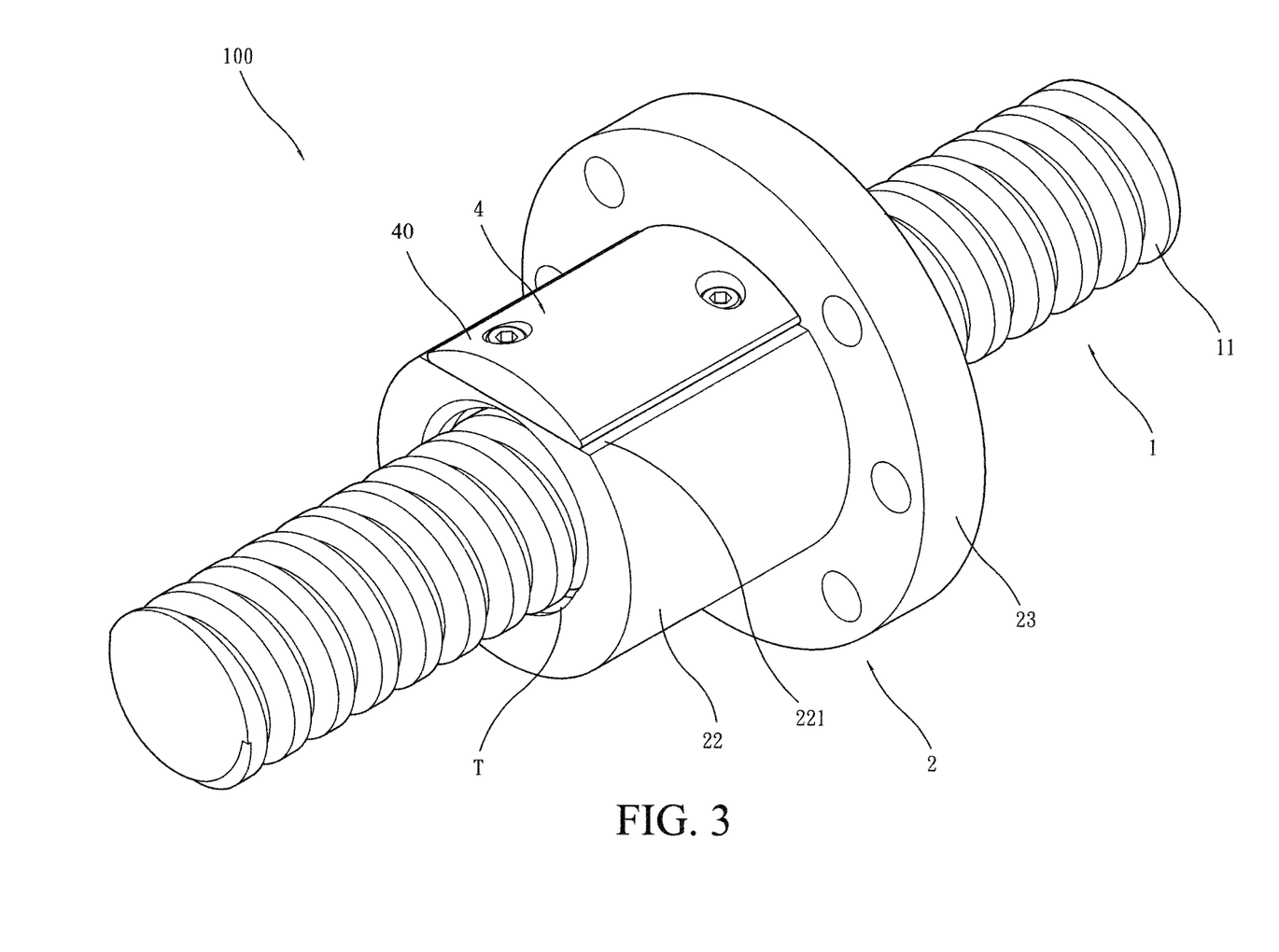
FIG. 3 is an assembled view of FIG. 1.
Figure 4:
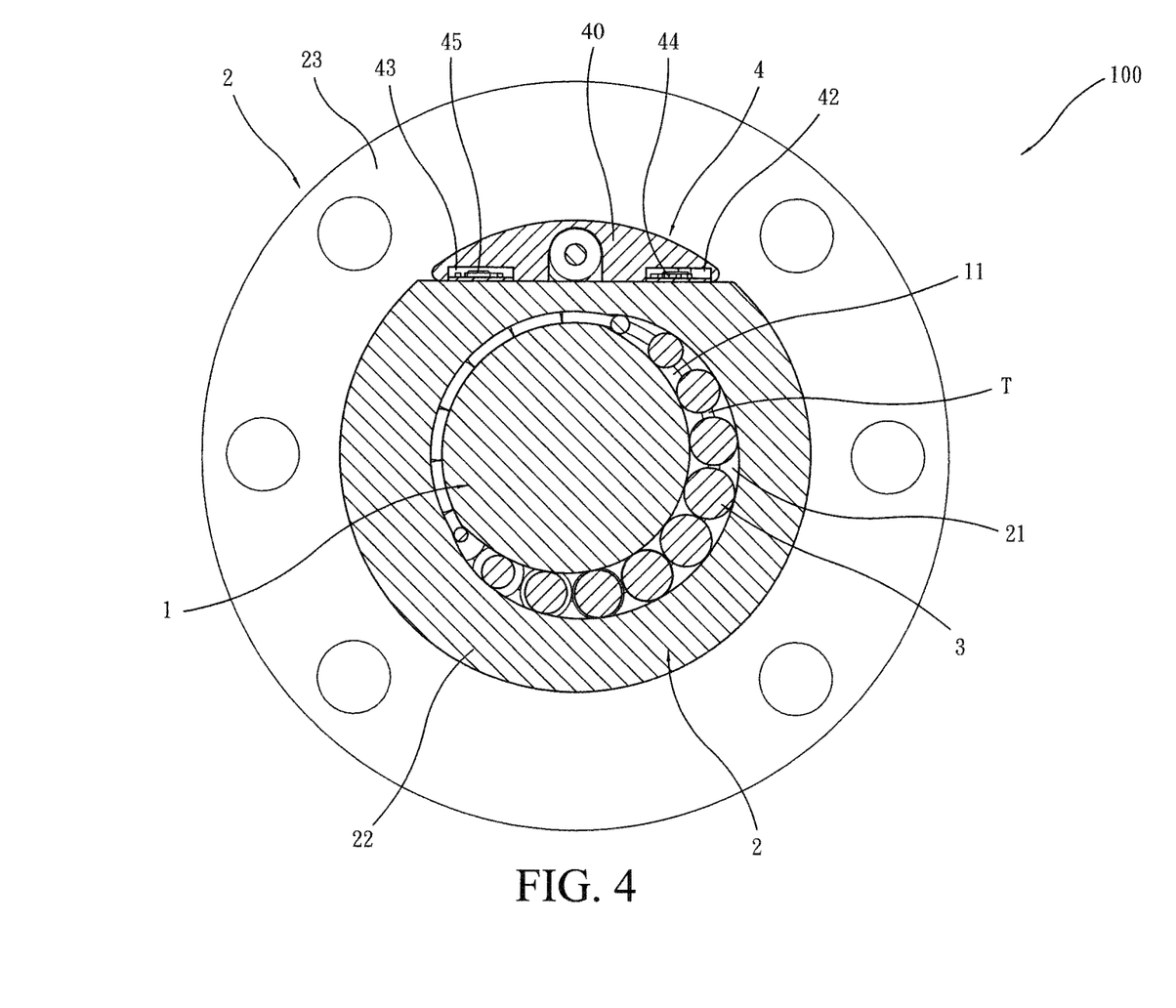
FIG. 4 is a cross-sectional view of the first preferred embodiment of the present invention.
Figure 5:
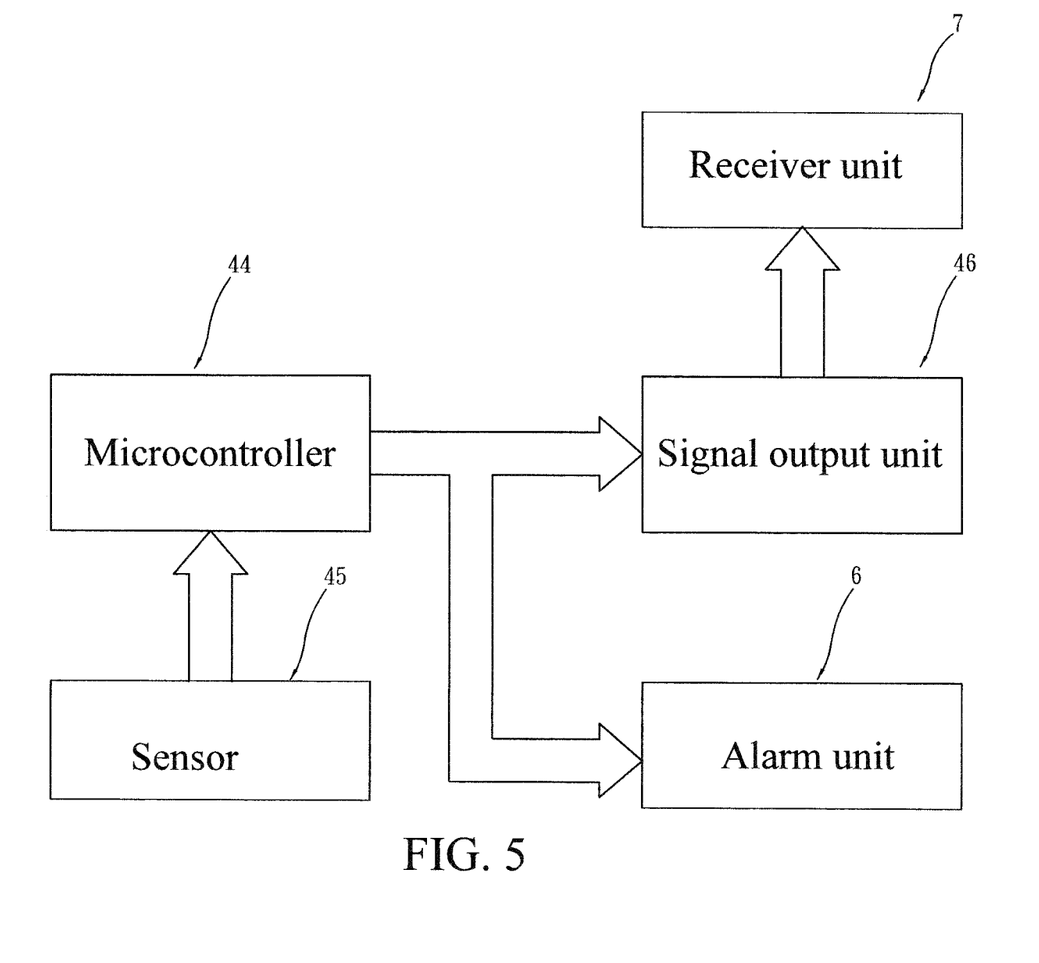
FIG. 5 is a circuit block diagram of the present invention.

The microcontroller 44 may supply a detection signal of the screw shaft 1, through a signal output unit 46 (as shown in FIG. 5), in a wireless or wired manner, to a receiver unit 7, wherein the receiver unit 7 can be a computer, a smart phone, or a tablet computer (such as a Pad), or may directly transmit the detection signal of the screw shaft 1 to the alarm unit 6.

Further, the cover body 40 of the cover 4 of the recirculation member 4 has a surface that faces the nut 2 and is provided with a connection line guide groove 48, wherein the connection line guide groove 48 allows for connection of electrical wires between the microcontroller 44 and the sensor 45, for further electrical connection, through a line guide slot 26, with the battery 5. It is noted that the microcontroller 44 and the sensor 45 may be connected with electrical wires 8 to supply, in a wired manner, external electrical source to the microcontroller 44 and the sensor 45.

With the above-described structure, there is no need to additionally and externally mount a sensor element to the nut and instead, a sensor is directly mounted to the cover body 40 of the cover 4, wherein the cover body 40 of the cover 4 is directly formed, on the inside thereof, with a recirculation passage 47 that receives a ball assembly 3 to move and recirculate therethrough and is removably mounted to a flattened portion 221 of the nut 2 to reduce the amount of space occupied thereby so that direct detection of the rotation state of the screw shaft 1 can be achieved and a detection signal of the screw shaft state can be transmitted to an alarm unit 6 to cause a sound (such as with a buzzer) or brightening or darkening or flashing of light (such as with a light-emitting diode) or to make transmission, in a wireless or wired manner, through a signal output unit 46 to a receiver unit 7 (such as a computer, a smart phone, or a tablet computer), to thereby achieve a function of detecting a rotation state of the screw shaft.

Figure 6:
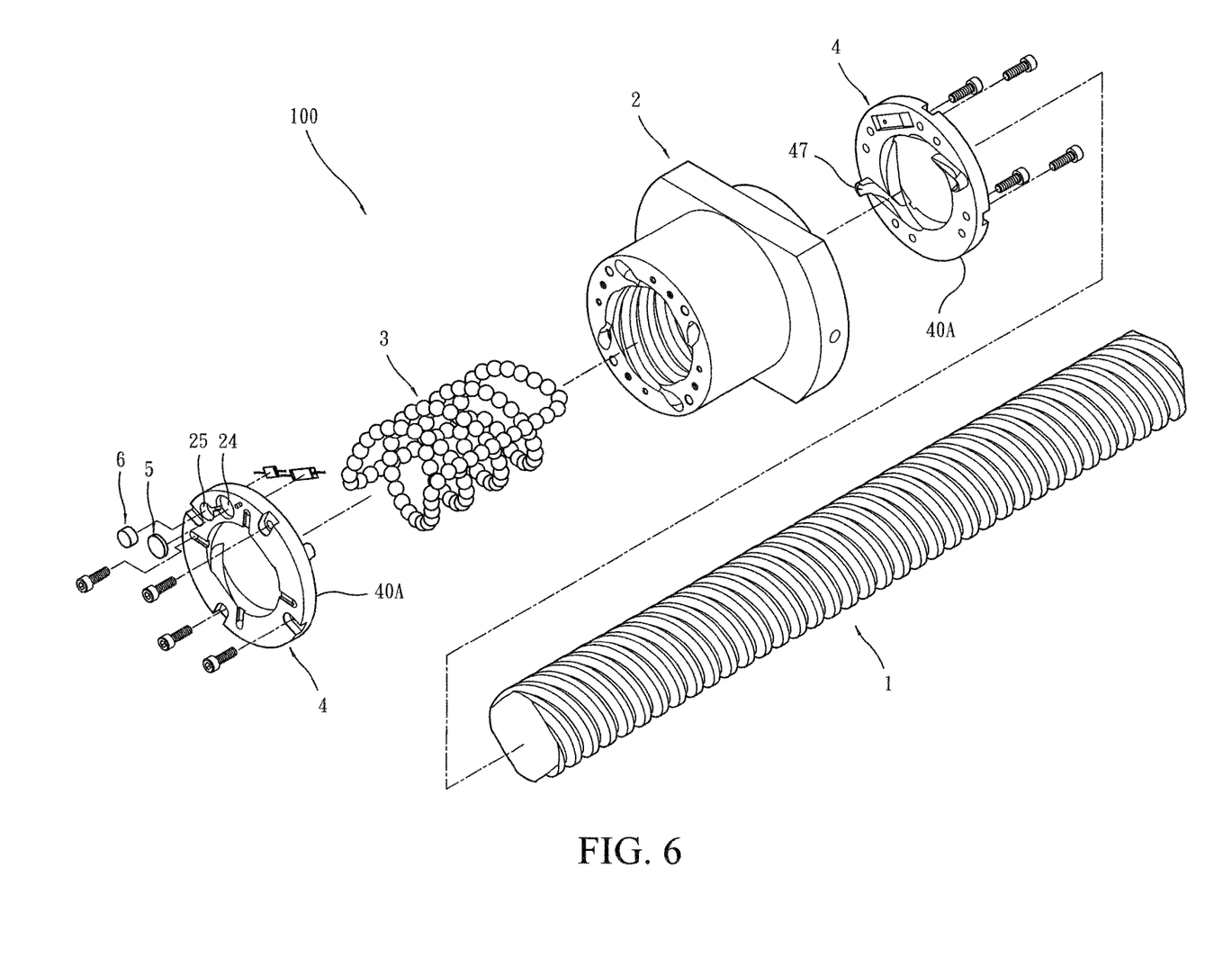
FIG. 6 is an exploded view, taken from a front side, showing a second preferred embodiment of the present invention.
Figure 7:
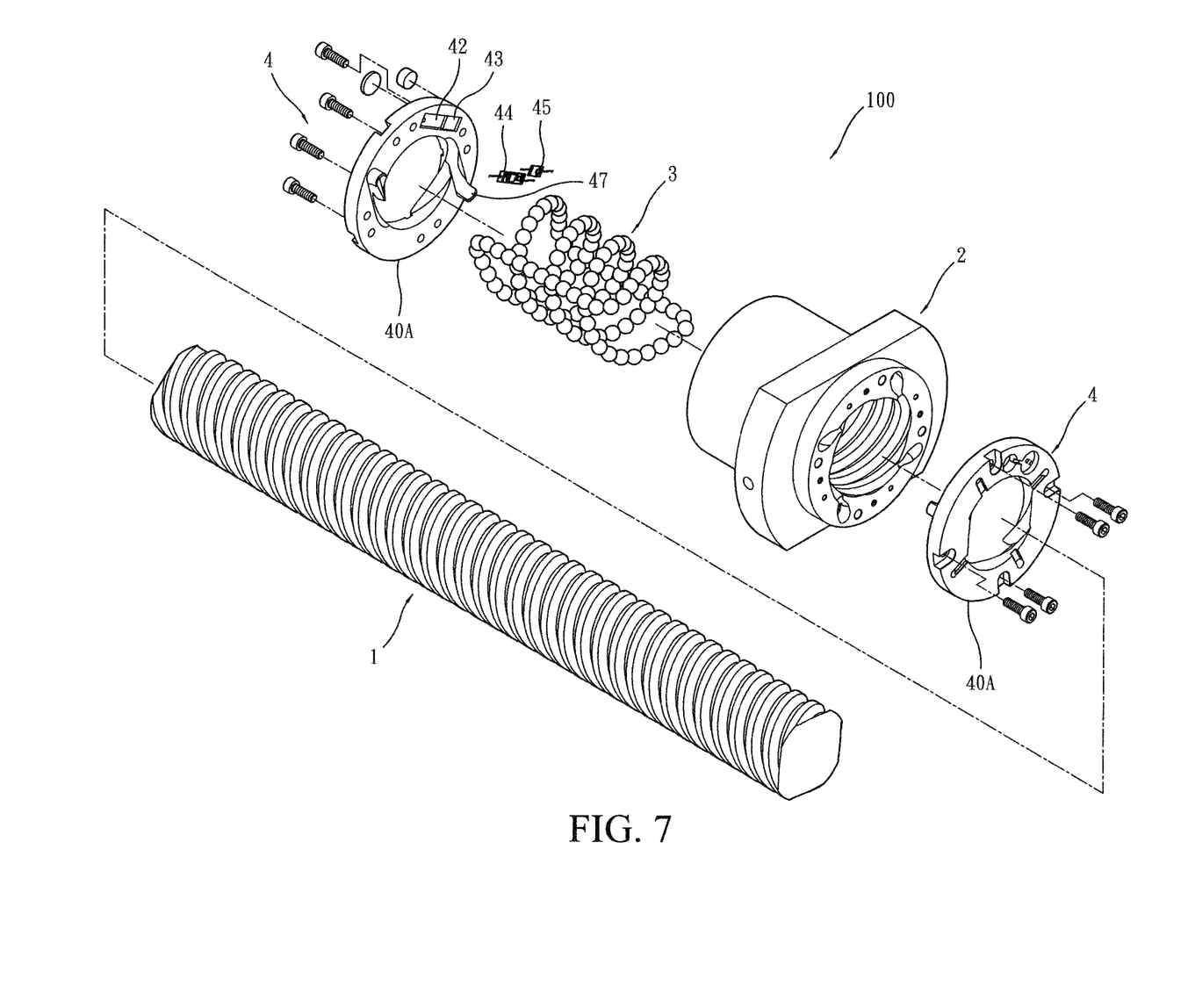
FIG. 7 is an exploded view, taken from a rear side, showing the second preferred embodiment of the present invention.
Figure 8:
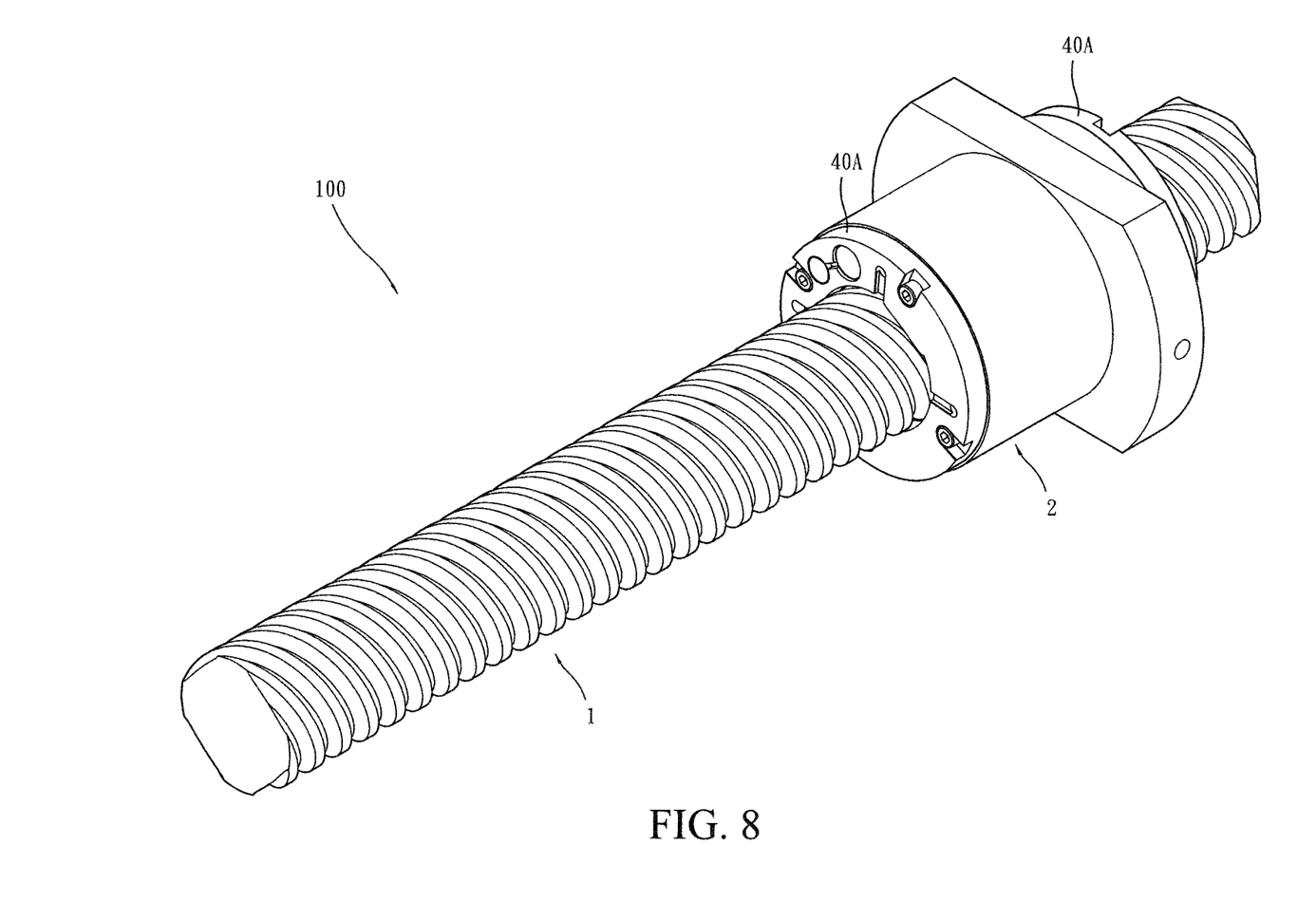
FIG. 8 is an assembled view of FIG. 6.

Referring to FIGS. 6-8, the present invention provides, in a second preferred embodiment thereof, a ball screw structure with detection function, also designated at 100, which, similar to the first embodiment, comprises a screw shaft 1, a nut 2, a ball assembly 3, and a recirculation member 4. A difference between the first and second embodiments is as follows:

In the instant embodiment, the recirculation member 4 is made up of two end covers 40A. The two end cover 40A are mounted to two ends of the nut 2. One of the end covers 40A has an end surface that faces the nut 2 and is provided with two recesses 42, 43. One of the recesses, such as the recess 42, receives a microcontroller 44 to dispose therein, while the other recess, such as the recess 43, receives the sensor 45 dispose therein. The end cover has an opposite end surface that is formed with a first accommodation compartment 24 and a second accommodation compartment 25 to respectively receive and hold a battery 5 and an alarm unit 6 therein.

Figure 9:
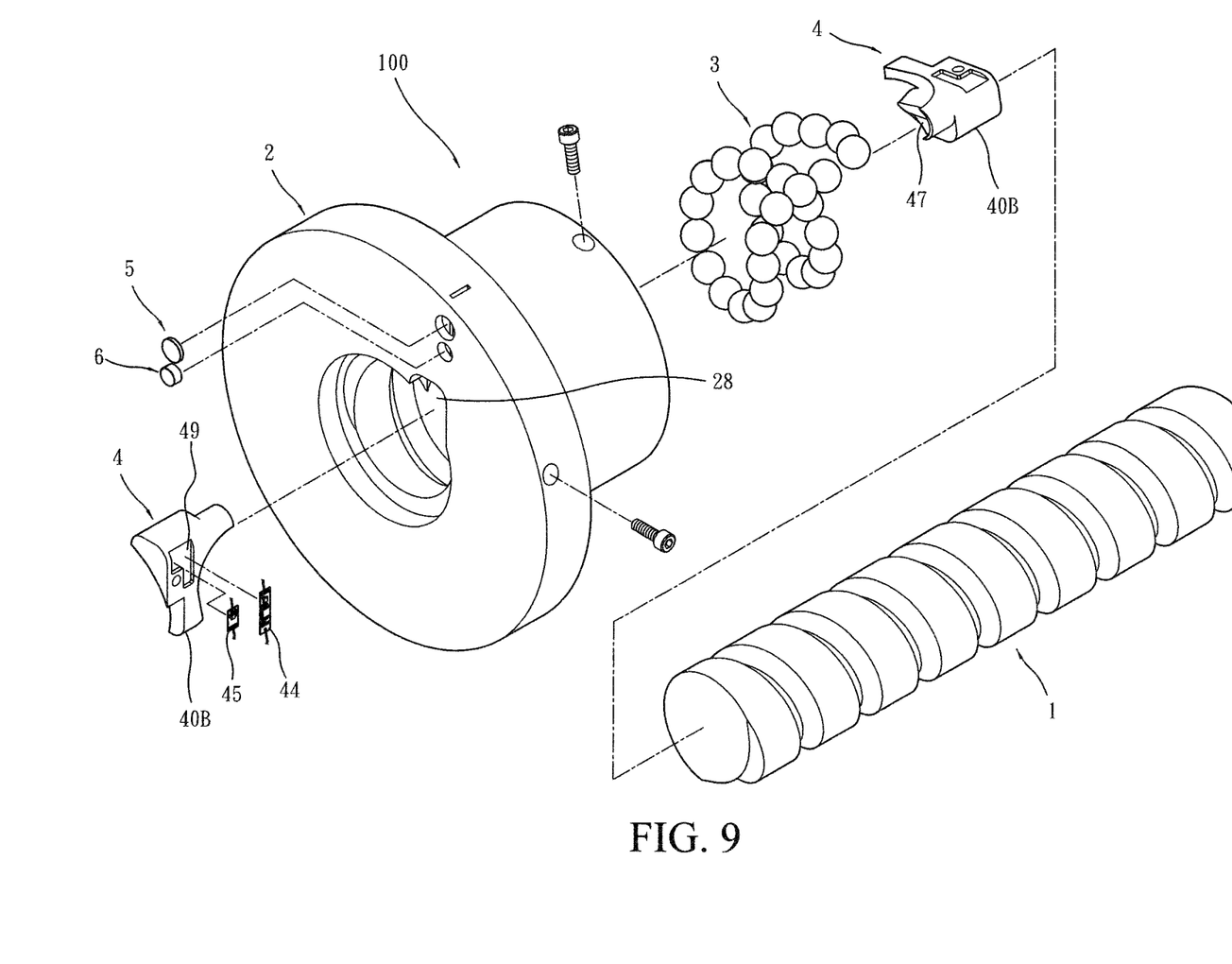
FIG. 9 is an exploded view, taken from a front side, showing a third preferred embodiment of the present invention.
Figure 10:
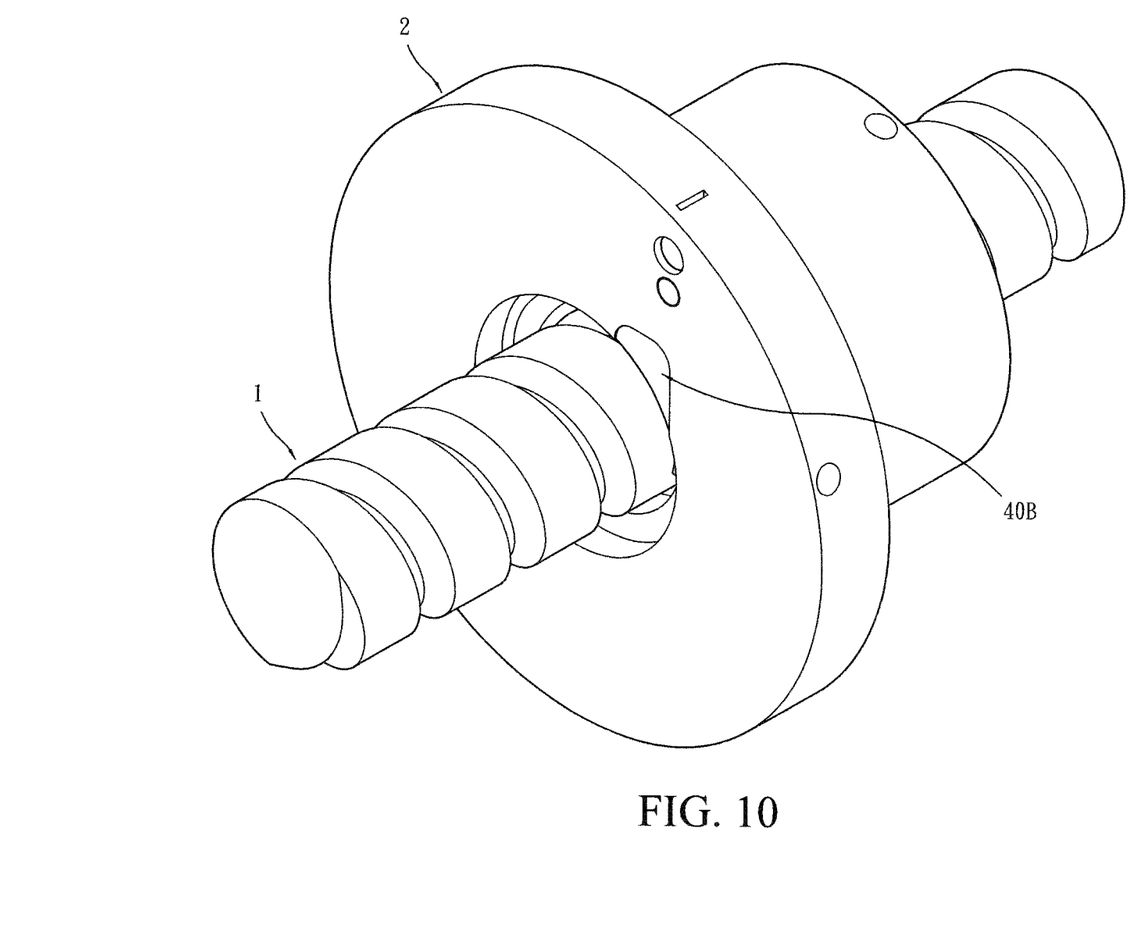
FIG. 10 is an assembled view of FIG. 9.

Referring to FIGS. 9-10, the present invention provides, in a third preferred embodiment thereof, a ball screw structure with detection function, also designated at 100, which, similar to the first embodiment, comprises a screw shaft 1, a nut 2, a ball assembly 3, and a recirculation member 4. A difference between the first and third embodiments is as follows:

In the instant embodiment, the recirculation member 4 is made up of two end plugs 40B. The nut has two mounting grooves 28 formed therein. The two end plugs 40B are respectively mounted in the two mounting grooves 28. One of the end plugs 40B has a bottom that is formed with a recess 49. The recess 49 receives and holds therein a microcontroller 44 and a sensor 45 herein.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A ball screw structure with detection function, comprising:
    a screw shaft, which comprises an external screw groove;
    a nut, which is mounted to the screw shaft in a manner of being movable in an axial direction of the screw shaft, the nut comprising an internal screw groove, the internal screw groove being arranged to correspond to the external screw groove of the screw shaft, the internal screw groove of the nut and the external screw groove of the screw shaft collectively defining a loading channel therebetween;
    a ball assembly, which is movable, through rolling, in the loading channel; and
    a recirculation member, which is removably mounted to the nut and comprises a microcontroller and a sensor mounted thereto to detect a rotation state of the screw shaft inside the nut, the recirculation member being formed therein with a recirculation passage in communication with the nut to allow the ball assembly to move and recirculate therethrough;
    wherein the recirculation member is made in the form of a recirculation cover that comprises a cover body and two recesses, the two recesses being formed in a surface of the cover body that faces the nut, one of the recesses receiving and holding therein the microcontroller, the other one of the recesses receiving and holding therein the sensor.

2. The ball screw structure with detection function according to claim 1, wherein the nut is formed with a first accommodation compartment and a second accommodation compartment that respectively receive and hold therein a battery and an alarm unit, the battery being electrically connected with the microcontroller and the sensor.

3. The ball screw structure with detection function according to claim 2, wherein the recirculation member has the surface that faces the nut and is provided with a connection line guide groove, the connection line guide groove allowing for connection of the sensor and the microcontroller for electrical connection with the battery.

4. The ball screw structure with detection function according to claim 1, wherein the microcontroller supplies, in a wireless or wired manner through a signal output unit, a detection signal of the screw shaft to a receiver unit.

5. The ball screw structure with detection function according to claim 1, wherein the microcontroller and the sensor are connectable through electrical wires for supply of an external electrical source to the microcontroller and the sensor.

* * * * *